US 8,140,075 B2

(12) United States Patent
Watanabe

(10) Patent No.: US 8,140,075 B2
(45) Date of Patent: *Mar. 20, 2012

(54) WIRELESS COMMUNICATION SYSTEM, SERVER AND MOBILE STATION THEREFOR

(75) Inventor: Koji Watanabe, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/588,719

(22) Filed: Oct. 26, 2009

(65) Prior Publication Data

US 2010/0046475 A1    Feb. 25, 2010

Related U.S. Application Data

(63) Continuation of application No. 10/883,785, filed on Jul. 6, 2004, now Pat. No. 7,610,049.

(30) Foreign Application Priority Data

Nov. 28, 2003  (JP) ................................. 2003-398393

(51) Int. Cl.
*H04W 36/00* (2009.01)
*H04W 4/00* (2009.01)
*H04B 7/00* (2006.01)

(52) U.S. Cl. ....... 455/436; 455/437; 455/442; 455/41.2; 370/328; 370/331; 370/338

(58) Field of Classification Search ............... 455/552.1, 455/67.11, 434, 41.2, 466, 553.1, 432.1, 455/433, 435.1, 436–443; 370/338, 331, 370/349, 328, 334

See application file for complete search history.

(56) References Cited

U.S. PATENT DOCUMENTS

| 6,549,522 | B1 | 4/2003 | Flynn | |
| 6,744,753 | B2 * | 6/2004 | Heinonen et al. | 370/338 |
| 6,993,335 | B2 * | 1/2006 | Natarajan et al. | 455/437 |
| 7,035,932 | B1 | 4/2006 | Dowling | |
| 7,047,036 | B2 * | 5/2006 | Shaheen et al. | 455/552.1 |
| 7,082,301 | B2 * | 7/2006 | Jagadeesan et al. | 455/436 |
| 7,089,005 | B2 * | 8/2006 | Reddy | 455/436 |
| 7,120,131 | B2 * | 10/2006 | Seppala et al. | 370/310 |
| 7,236,470 | B1 * | 6/2007 | Bims | 370/328 |

(Continued)

OTHER PUBLICATIONS

Jon Inouye et al., "Dynamic Network Reconfiguration Support for Mobile Computers", 1997 ACM, pp. 1-10.

(Continued)

*Primary Examiner* — Brandon Miller
(74) *Attorney, Agent, or Firm* — Stites & Harbison, PLLC; Juan Carlos A. Marquez, Esq.

(57) ABSTRACT

This invention provides a wireless communication system wherein a network to which a mobile station should be handed over can be selected, using parametric data collected from network components other than the mobile station. Time taken for a handover between different types of network systems is reduced. The wireless communication system of the present invention comprises a mobile station equipped with multiple wireless interfaces, a server connected to a fixed network, and multiple access points. The mobile station determines available wireless interfaces and sends notification of the available interfaces' identifiers to the server. The server collects managerial data from network components and selects a wireless interface, based on the notification from the mobile station and the managerial data. The mobile station registers its locations in visiting networks corresponding to multiple available wireless interfaces with the server. The server retains the registrations of mobile station locations for the above wireless interfaces.

11 Claims, 14 Drawing Sheets

U.S. PATENT DOCUMENTS

| | | | |
|---|---|---|---|
| 7,280,505 B2 * | 10/2007 | Chaskar et al. | 370/331 |
| 7,308,263 B2 * | 12/2007 | Gallagher et al. | 455/439 |
| 7,450,544 B2 * | 11/2008 | Rue | 370/331 |
| 7,610,049 B2 * | 10/2009 | Watanabe | 455/436 |
| 2003/0182419 A1 | 9/2003 | Barr et al. | |
| 2004/0048572 A1 * | 3/2004 | Godfrey | 455/41.2 |
| 2004/0052238 A1 | 3/2004 | Borella et al. | |
| 2004/0097232 A1 | 5/2004 | Haverinen | |
| 2004/0117508 A1 | 6/2004 | Shimizu | |
| 2004/0137901 A1 * | 7/2004 | Hamasaki et al. | 455/436 |
| 2004/0203788 A1 * | 10/2004 | Fors et al. | 455/439 |
| 2004/0246922 A1 | 12/2004 | Ruan et al. | |
| 2004/0264410 A1 * | 12/2004 | Sagi et al. | 370/331 |
| 2005/0047368 A1 * | 3/2005 | Kotzin et al. | 370/331 |
| 2005/0053034 A1 * | 3/2005 | Chiueh | 370/331 |
| 2005/0070280 A1 * | 3/2005 | Jung et al. | 455/434 |
| 2005/0096048 A1 * | 5/2005 | Clare et al. | 455/433 |
| 2005/0147068 A1 * | 7/2005 | Rajkotia | 370/338 |
| 2006/0084417 A1 * | 4/2006 | Melpignano et al. | 455/418 |
| 2006/0193272 A1 * | 8/2006 | Chou et al. | 370/310 |

OTHER PUBLICATIONS

Marc Bechler et al., "A Flexible Multiplexing Mechanism for Supporting Quality of Service in Mobile Environments", IEEE, Published in the Proceedings of the Hawaii International Conference on System Sciences, Jan. 3-6, 2001, 8 pages.

Office Action from the Chinese Patent Office regarding Chinese Application No. 2004100708416, received Mar. 13, 2009.

* cited by examiner

FIG.5

| TYPE | MS HOST ID | MEDIUM IN-SERVICE | MEDIUM TYPE 1 | MAC ADDRESS |
|---|---|---|---|---|
| 61 | 62 | 63 | 64 | 65 |

FIG.6

| TYPE | MS HOST ID | MEDIUM IN-SERVICE | MEDIUM TYPE 1 | MAC ADDRESS | HOME ADDRESS | CARE-OF ADDRESS |
|---|---|---|---|---|---|---|
| 71 | 72 | 73 | 74 | 75 | 76 | 77 |

FIG.9

| | 121 | 122 | 123 | 124 | 125 | 126 | 127 | 128 |
|---|---|---|---|---|---|---|---|---|
| | MS HOST ID1 | MEDIUM IN-SERVICE | NUMBER OF MEDIA | MEDIUM TYPE | MAC ADDRESS | AP ADDRESS | HOME ADDRESS | CARE OF ADDRESS |
| | | | | ... | ... | ... | ... | ... |
| | MS HOST ID2 | MEDIUM IN-SERVICE | NUMBER OF MEDIA | MEDIUM TYPE | MAC ADDRESS | AP ADDRESS | HOME ADDRESS | CARE OF ADDRESS |
| | ... | ... | ... | ... | ... | ... | ... | ... |
| | MS HOST IDn | MEDIUM IN-SERVICE | NUMBER OF MEDIA | MEDIUM TYPE | MAC ADDRESS | AP ADDRESS | HOME ADDRESS | CARE OF ADDRESS |

AS MANY SETS OF THESE DATA ITEMS AS THE NUMBER OF SYSTEMS AVAILABLE FOR EACH MS ARE INCLUDED.

FIG.10

| 101 | 102 | 103 | 104 | | 105 | 106 | 107 | |
|---|---|---|---|---|---|---|---|---|
| AP ID W1 | MS ID W11 | MS ID W12 | MS ID W13 | ... | RSSI W11 | RSSI W12 | RSSI W13 | ... |
| AP ID W2 | MS ID W21 | MS ID W22 | MS ID W23 | ... | RSSI W21 | RSSI W22 | RSSI W23 | ... |
| ... | | | | | | | | ... |
| AP ID Wk | MS ID Wk1 | MS ID Wk2 | MS ID Wk3 | ... | RSSI Wk1 | RSSI Wk2 | RSSI Wk3 | ... |

FIG.11

| 111 | 112 | 113 | 114 | | 115 | 116 | 11 | |
|---|---|---|---|---|---|---|---|---|
| AP ID E1 | MS ID E11 | MS ID E12 | MS ID E13 | ... | C/I E11 | C/I E12 | C/I E13 | ... |
| AP ID E2 | MS ID E21 | MS ID E22 | MS ID E23 | ... | C/I E21 | C/I E22 | C/I E23 | ... |
| ... | | | | | | | | ... |
| AP ID Em | MS ID Em1 | MS ID Em2 | MS ID Em3 | ... | C/I Em1 | C/I Em2 | C/I Em3 | ... |

FIG.12

| TYPE 51 | MS HOST ID 52 | IN-SERVICE MEDIUM 53 | NUMBER OF MEDIA 54 | MEDIUM TYPE 1 55 | MAC ADDRESS 56 | AP ADDRESS 57 | HOME ADDRESS 58 | CARE OF ADDRESS 59 | AUTHENTICATED STATUS 60 | ... |

AS MANY SETS OF THESE DATA ITEMS AS THE NUMBER OF SYSTEMS AVAILABLE FOR MS ARE INCLUDED.

FIG.13

| 121 | 122 | 123 | 124 | 125 | 126 | 127 | 128 | 129 | |
|---|---|---|---|---|---|---|---|---|---|
| MS HOST ID1 | MEDIUM IN-SERVICE | NUMBER OF MEDIA | MEDIUM TYPE | MAC ADDRESS | AP ADDRESS | HOME ADDRESS | CARE OF ADDRESS | AUTHENTICATED STATUS | ... |
| MS HOST ID2 | MEDIUM IN-SERVICE | NUMBER OF MEDIA | MEDIUM TYPE | MAC ADDRESS | AP ADDRESS | HOME ADDRESS | CARE OF ADDRESS | AUTHENTICATED STATUS | ... |
| ... | ... | ... | ... | ... | ... | ... | ... | ... | |
| MS HOST IDn | MEDIUM IN-SERVICE | NUMBER OF MEDIA | MEDIUM TYPE | MAC ADDRESS | AP ADDRESS | HOME ADDRESS | CARE OF ADDRESS | AUTHENTICATED STATUS | ... |

AS MANY SETS OF THESE DATA ITEMS AS THE NUMBER OF SYSTEMS AVAILABLE FOR EACH MS ARE INCLUDED.

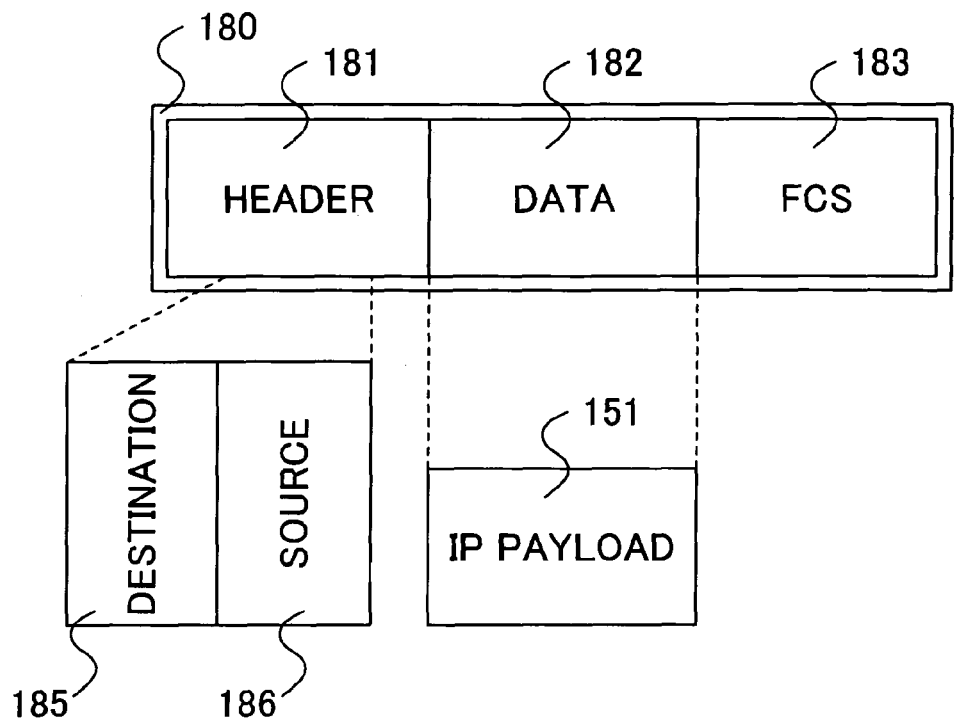

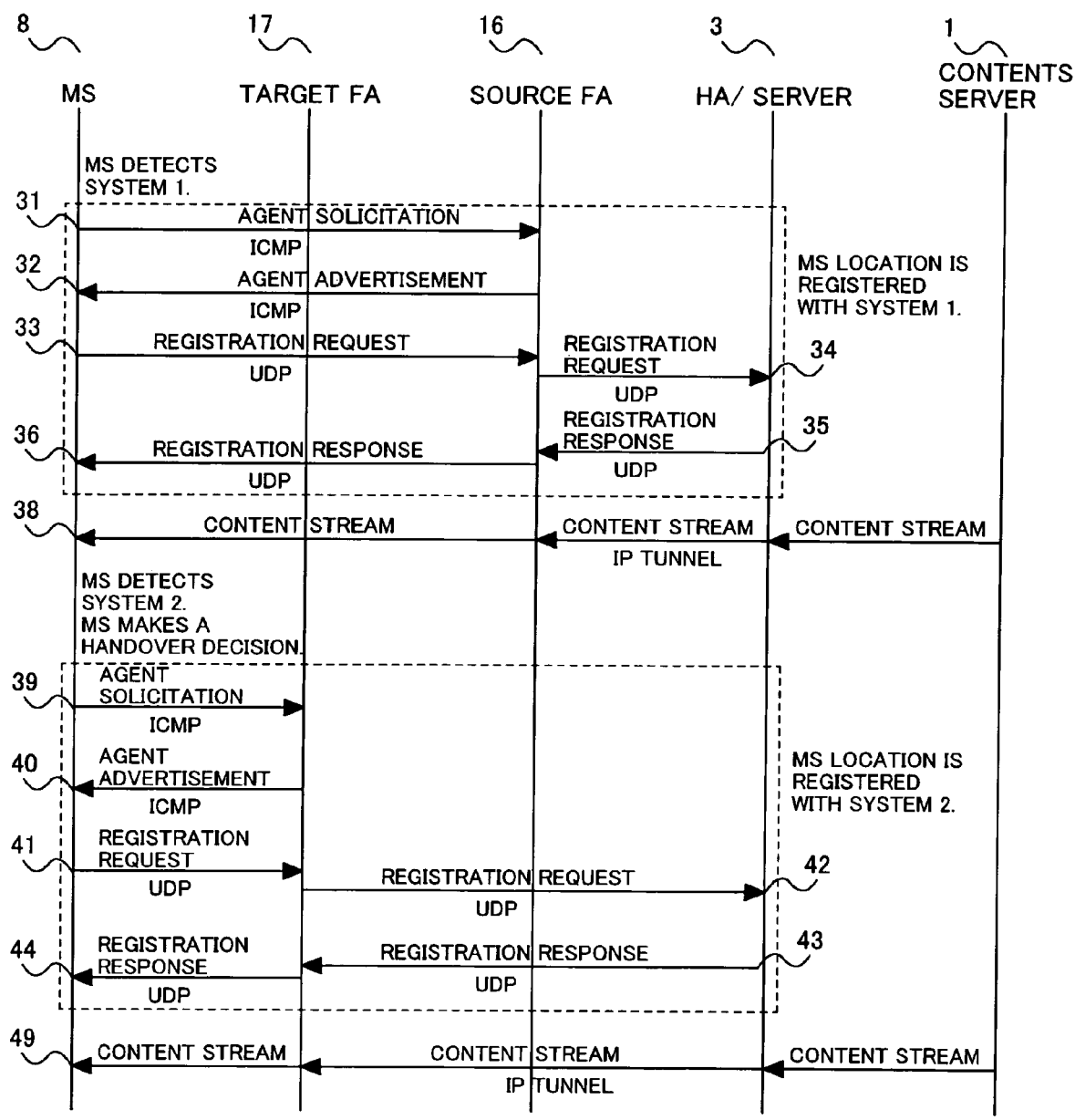

WIRELESS COMMUNICATION SYSTEM, SERVER AND MOBILE STATION THEREFOR

CROSS REFERENCE TO RELATED APPLICATIONS

This application is a Continuation Application of U.S. application Ser. No. 10/883,785 filed on Jul. 6, 2004 now U.S. Pat. No. 7,610,049. The present application claims priority from U.S. application Ser. No. 10/883,785 filed on Jul. 6, 2004, which claims priority from Japanese patent application 2003-398393 filed Nov. 28, 2003, the entire disclosure of which is hereby incorporated by reference.

FIELD OF THE INVENTION

The present invention relates to a handover technique between wireless systems.

BACKGROUND OF THE INVENTION

Handovers between different types of communications systems such as between a cellular mobile telephony network and a wireless LAN are called vertical handovers and study results thereof have been reported in papers, a few of which are cited below.

In one paper, for example, J. Inouye, J. Binkley, J. Watpole, "Dynamic Network Reconfiguration Support for Mobile Computers," Proceedings of ACM/IEEE International Conference on Mobile Computing and Networking (Mobicom'97), Budapest, September 1997 (Non-patent document 1), an example of a networks system where a mobile host adaptively changes over between its network interfaces and transmission routes is discussed. According to this paper, an experiment using this networks system revealed that, when the mobile host changes over between an interface for a wired LAN and an interface for a wireless LAN, for example, its Internet Protocol (IP) address changes as the interface changes, and consequently, an application such as telnet cannot be continued. If, for example, the mobile station performs path rerouting from the wired LAN to the wireless LAN, it has to release a communication path set up, using its IP address within the wired LAN, and reconnect to the wireless LAN, using its IP address within the wireless LAN. The mobile station has to re-execute all applications running on it for new connection.

In another paper, for example, Marc Bechler, Hartmut Ritter, "A flexible Multiplexing Mechanism for Supporting Quality of Service in Mobile Environments," Proceedings of the Hawaii International Conference on System Science, Maui, Hi., January 2001 (Non-patent document 2), examples of carrying out handovers between different types of communication systems such as between a wireless LAN and a cellular mobile telephony network, using Mobile IP technology, are discussed. In these examples, an IP packet into which an application's data is packaged for transmission to a particular destination is encapsulated into an IP packet with the IP address of a selected network device and then transmitted via the network device to the destination. Because the IP address of the IP packet of the application's data is unchanged, the application can continue while the handover takes place.

FIG. 1 shows an example of conventional wireless system architecture using the Mobile IP technology. Reference numeral 1 denotes a contents server, 2 denotes an IP network, 3 denotes a home agent of Mobile IP, and 8 denotes a mobile station. Reference numeral 4 denotes a foreign agent in a wireless LAN network, 5 denotes the wireless LAN network established by a wireless LAN service provider, and 9, 10, and 11 denote access points of the wireless LAN. Reference numeral 6 denotes a foreign agent in a 1xEvDO (cellular mobile telephony system) network, 7 denotes the 1xEvDO network established by a 1xEvDO service provider, and 12, 13, and 14 are access points of the 1xEvDO. Reference numeral 15 denotes a fixed network. Communication from the home agent to a foreign agent is performed through an "IP tunnel" formed by encapsulating an IP packet within an IP packet. The address of the end point of the IP tunnel is a Care-of address. A home address is an IP address assigned to the mobile station 8, which is independent of where the mobile station 8 is located and attached to the Internet. IP packets transmitted to the home address of the mobile station 8 are intercepted by the home agent and then forwarded to the Care-of address. The IP tunnel may be terminated at the mobile station 8 itself. The foreign agent or the mobile station 8 itself at the end point of the IP tunnel receives encapsulated datagrams and the foreign agent forwards decapsulated IP packets to the mobile station 8.

FIG. 2 illustrates an example of exchanging messages for a handover of the mobile station (MS) 8 in the system of FIG. 1. If the mobile station 8 is handed over from a wireless LAN access point to a 1xEvDO access point, the Source FA 16 is a foreign agent 4 in the wireless LAN system and the Target FA 17 is a foreign agent 6 in the 1xEvDO system. If the mobile station 8 is handed over from a 1xEvDO access point to a wireless LAN access point, the Source FA 16 is a foreign agent 6 in the 1xEvDO system and the Target FA 17 is a foreign agent 4 in the wireless LAN system. Assume that the mobile station 8 is downloading contents 20 from the contents server 1 via the foreign agent 16. When the mobile station 8 detects a new communication system and determines to perform a handover to that system, it transmits an Agent Solicitation 21 for receipt by any nearby foreign agent within the subnet of the new system to solicit transmission of an Agent Advertisement message. The foreign agent 17 transmits an Agent Advertisement 22 to announce its service over the subnet and, when the mobile station 8 receives this message, it determines in which network it is attached. Even when not receiving the Agent Solicitation 21, the foreign agent 17 periodically broadcasts the Agent Advertisement 22 over the subnet. The mobile station 8 transmits a Registration Request 23, 24 via the foreign agent 17 to the home agent 3 as a message to register its location with the home agent 3. The Registration Request 23 message includes the home address of the mobile station 8, the home agent address, and the address, care-of address of the foreign agent 17. Having received the Registration Request 23 message, the home agent 3 registers the care-of address of the mobile station 8 into a forwarded-to-address table. The home agent 3 transmits back a Registration Response 25 as a message to return the result of the mobile station's location registration to the foreign agent 17. The foreign agent 17 transmits back a Registration Response 26 as a message to return the result of the mobile station's location registration to the mobile station 8. The home agent 3 forwards contents 27 via the foreign agent 17. The foreign agent 17 receives IP encapsulated packets and delivers decapsulated IP payloads to the mobile station 8. Handover time depends on timing when the mobile station 8 receives the Agent Advertisement 22 and time required for rerouting on the IP layer is a few seconds.

FIG. 15 shows an encapsulation format example conforming to the IP encapsulation method as specified in RFC2003. The home agent 3 encapsulates an IP packet 151 consisting of an IP header 152 and an IP payload 153, as an IP payload 157, within an IP packet 155. In the IP header 152, the source address is the IP address of the contents server 1 and the destination address is the home address of the mobile station 8. In the IP header 156, the source address is the IP address of the home agent 3 and the destination address is the care-of address of the mobile station 8.

Because the encapsulation method in the above example encapsulates an IP packet within another IP packet, control information increases by the additional IP header and information transmission efficiency decreases. To reduce the increase in control information, another encapsulation method has been proposed as an Internet standard's track protocol. FIG. 14 shows an encapsulation format example conforming to the encapsulation method as specified in RFC2004. The home agent 3 constructs an IP packet 161 by adding an IP header 162 and an address 163 to the IP payload 153 of an IP packet 151. In the IP header 162, the source address is the IP address of the home agent 3 and the destination address of the care-of address of the mobile station 8. The address 163 is the home address of the mobile station 9 and a minimum of 12 bytes of information is added.

[Non-patent document 1] J. Inouye, J. Binkley, J. Watpole, "Dynamic Network Reconfiguration Support for Mobile Computers," Proceedings of ACM/IEEE International Conference on Mobile Computing and Networking (Mobicom '97), Budapest, September 1997

[Non-patent document 2] Marc Bechler, Hartmut Ritter, "A flexible Multiplexing Mechanism for Supporting Quality of Service in Mobile Environments," Proceedings of the Hawaii International Conference on System Science, Maui, Hi., January 2001

SUMMARY OF THE INVENTION

When a system to which a mobile station should be handed over is determined, using measurements data only obtained by the mobile station, a system that is not optimal in terms of efficiency of resources usage may be selected and its possibility is high. For example, even if the strength of radio signals received from an access point that is a possible handover candidate is sufficiently strong, if user connections to the access point are locally increased, then the communication rate per user will decrease. One object of the present invention is to provide a handover method in which an optimal system to which a mobile station should be handed over is determined, using more amount of parametric data obtained from the whole network, such as the number of users per access point.

Through consideration of the conditions that it takes in the order of seconds for rerouting on the IP layer, another object of the present invention is to realize faster rerouting of an IP packet transmission path.

Furthermore, high security authentication is generally heavy processing. Such authentication processing that is assumed to be performed each time of rerouting imposes a large load on the system in question and consumes time. For example, according to a typical authentication protocol, IEEE802.1x, it takes in the order of seconds to complete one authentication process. Yet another object of the present invention is to provide a faster handover method taking authentication into consideration.

One aspect of the present invention resides in a wireless communication system comprising a mobile station equipped with a plurality of wireless interfaces, a server connected to a network, and a plurality of access points. The invention primarily presupposes that the plurality of wireless interfaces are different types such as wireless LAN and 1xEvDO; however, these interfaces may be same type. Given that the plurality of wireless interfaces are same type, the mobile station has a plurality of wireless interfaces of same type. The wireless interfaces may be other types than wireless LAN and 1xEvDO. For example, the types of the wireless may involve W-CDMA, CDMA 2000 1x, PHS, UWB, and Bluetooth. The mobile station determines available wireless interfaces and sends notification of the available interfaces' identifiers to the server. The mobile station also transmits a handover request message to execute a handover to another one of the plurality of wireless interfaces to the server. The server collects managerial data from components of the network and selects a wireless interface to be used for communication with the mobile station, based on the notification from the mobile station and the managerial data. Also, the server sends notification of the selected wireless interface's identifier to the mobile station and controls packet transmission path routing, based on the handover request message from the mobile station.

In the present invention, the network components are, for example the access points and the managerial data comprises the identifiers of the wireless interfaces accommodated by the access points and the radio conditions of the wireless interfaces accommodated by the access points. The server selects, for example, a wireless interface operating at the highest throughput from the wireless interfaces conforming to different standards as the wireless interface to be used for communication.

Another aspect of the present invention resides in a wireless communication system including a mobile station equipped with a plurality of wireless interfaces and a server connected to a network. The mobile station determines available wireless interfaces and registers its locations in visiting networks corresponding to the plurality of available wireless interfaces with the server. Also, the mobile station transmits a handover request message to execute a handover to any of the wireless interfaces to the server. The server retains the registrations of the mobile station locations for the plurality of available wireless interfaces. Furthermore, the server controls transmission path routing to forward packets to any one of the available wireless interfaces, based on the handover request message. The registrations of the mobile station locations are Mobile IP compliant registrations of the locations.

Still another aspect of the present invention resides in a wireless communication system including a mobile station equipped with a plurality of wireless interfaces and a plurality of access points. Based on either the authenticated status or the type of authentication for each of the wireless interfaces, a wireless interface to which the mobile station should be handed over is selected.

Means for selecting the wireless interface, for example, preferentially selects an authenticated wireless interface rather than an unauthenticated wireless interface. Or the above means, for example, preferentially selects a wireless interface that it takes a short time to authenticate rather than a wireless interface that it takes a long time to authenticate.

In the wireless communication system of the present invention, the mobile station determines available wireless interfaces and sends notification of the available interfaces' identifiers to the server. The server collects managerial data from components of the network and selects a wireless interface, based on the notification from the mobile station and the managerial data. Therefore, by using the combination of the data from the mobile station and the data collected from the network components, an optimal wireless interface to which the mobile station should be handed over can be selected.

Also, the server sends notification of the selected wireless interface's identifier to the mobile station and controls packet transmission path routing, based on the handover request message from the mobile station. Therefore, the mobile station can make its decision to execute a handover, and the result of the selection of the wireless interface made by the server may be reflected to this decision.

The mobile station also transmits a handover request message to execute a handover to any of the plurality of wireless interfaces to the server. Even if the mobile station makes a handover decision, the mobile station can actively initiate the handover procedure and it is detected that the communication via the wireless interface to which the mobile station is now connecting is disconnected. Even if the mobile station makes a handover decision, an increase in traffic and transmission delay can be reduced with respect to the case where all necessary information is transmitted to the server and a handover decision is made.

The server of the present invention selects, for example, a wireless interface operating at the highest data rate from the wireless interfaces conforming to different standards as the wireless interface to which the mobile station should be handed over. Therefore, the handover to a system operating at a high transmission rate can be performed more exactly with respect to the case where a handover is performed, according to only the radio conditions of wireless channels. The throughput between the mobile station and the fixed network is enhanced and a service that places less load on the mobile station can be provided. Because traffic can be distributed by deselecting a congested system, the efficiency of usage of wireless resources is enhanced.

The mobile station of the present invention determines available wireless interfaces and registers its locations in visiting networks corresponding to the plurality of available wireless interfaces with the server. Also, the mobile station transmits a handover request message to execute a handover to any of the wireless interfaces to the server. The server retains the registrations of the mobile station locations for the plurality of available wireless interfaces. Furthermore, the server controls transmission path routing to forward packets to any one of the available wireless interfaces, based on the handover request message. The registrations of the mobile station locations are Mobile IP compliant registrations of the locations. Therefore, the mobile station can register its locations associated with the plurality of available wireless interfaces prior to a handover. Because the procedure required for packet transmission path rerouting after the mobile station makes a handover decision can be curtailed, the rerouting time can be shortened.

Furthermore, in the wireless communication system of the present invention, a wireless interface to which the mobile station should be handed over is selected, based on either the authenticated status or the type of authentication for each of the wireless interfaces.

When a wireless interface to which the mobile station should be handed over is selected, for example, an authenticated wireless interface is preferentially selected rather than an unauthenticated wireless interface. Or, for example, a wireless interface that it takes a short time to authenticate is preferentially selected rather than a wireless interface that it takes a long time to authenticate. Therefore, a wireless interface that it takes shorter to authenticate can be selected preferentially as the one to which the mobile station should be handed over, and as a result, the handover time can be shortened.

BRIEF DESCRIPTION OF THE DRAWINGS

FIG. 5 shows a message format example according to the present invention;

FIG. 6 shows a message format example according to the present invention;

FIG. 9 shows an example of a table stored on the server in accordance with the present invention;

FIG. 10 shows an example of a table stored on the server in accordance with the present invention;

FIG. 11 shows an example of a table stored on the server in accordance with the present invention;

FIG. 12 shows a message format example according to the present invention;

FIG. 13 shows an example of a table stored on the server in accordance with the present invention;

FIG. 17 shows a conventional packet format example;

FIG. 18 shows an example of a table stored on the server in accordance with the present invention; and FIG. 19 illustrates an example of exchanging messages for a mobile station handover according to prior art.

DETAILED DESCRIPTION OF THE PREFERRED EMBODIMENTS

Figure 1:
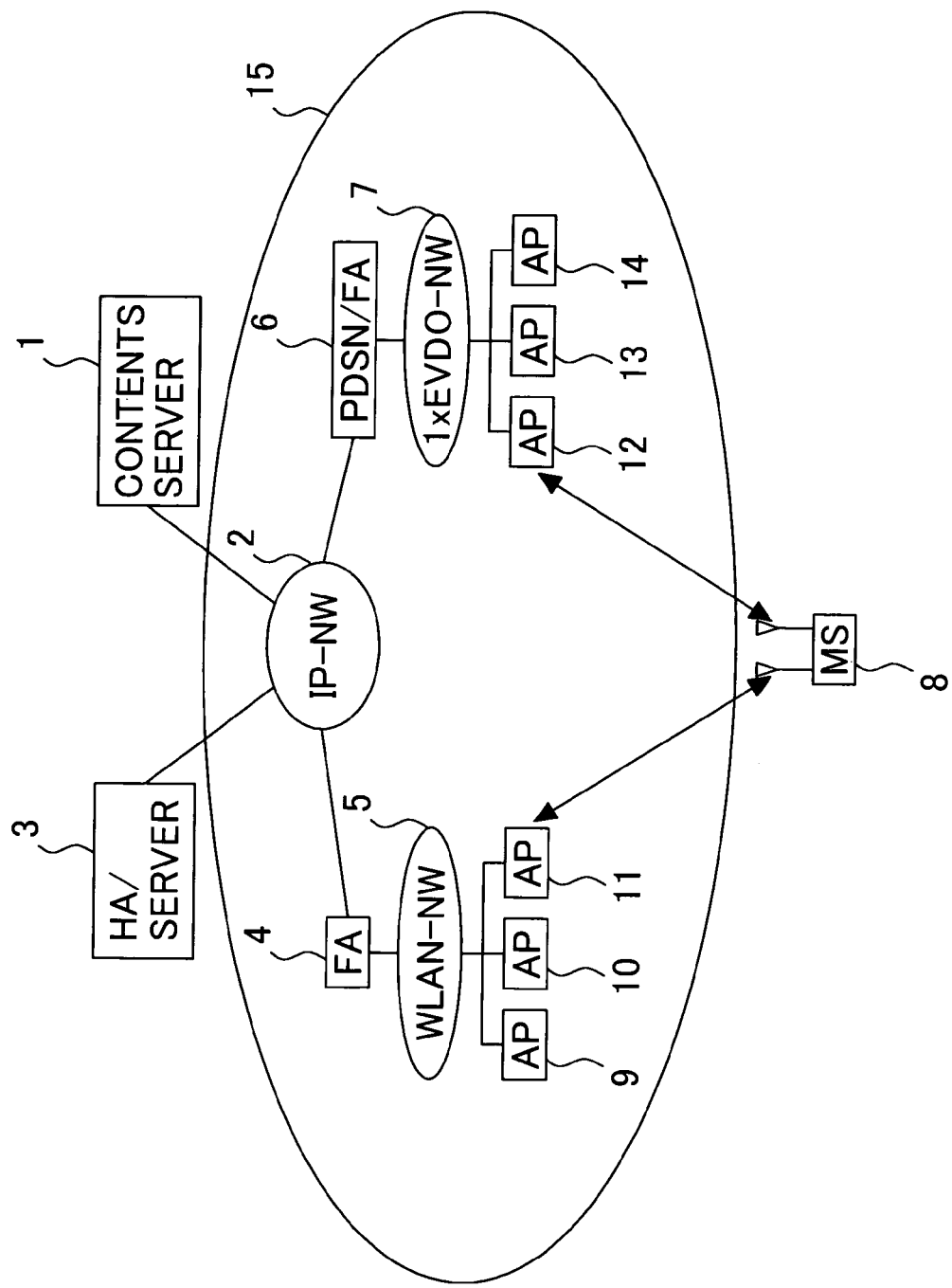
FIG. 1 is a diagram showing an example of wireless system architecture.
Figure 2:
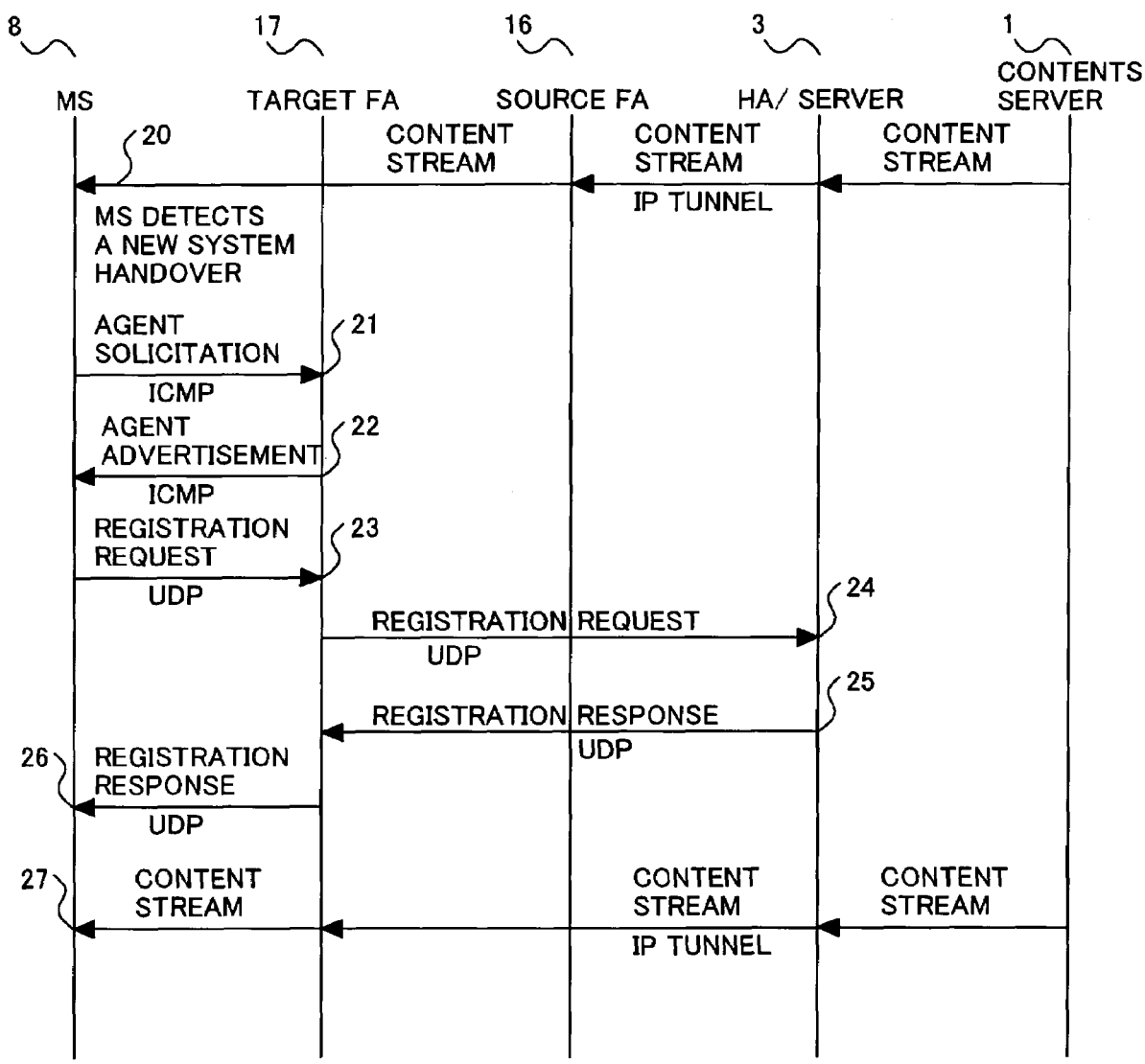
FIG. 2 illustrates an example of a mobile station location registration procedure according to prior art.
Figure 3:
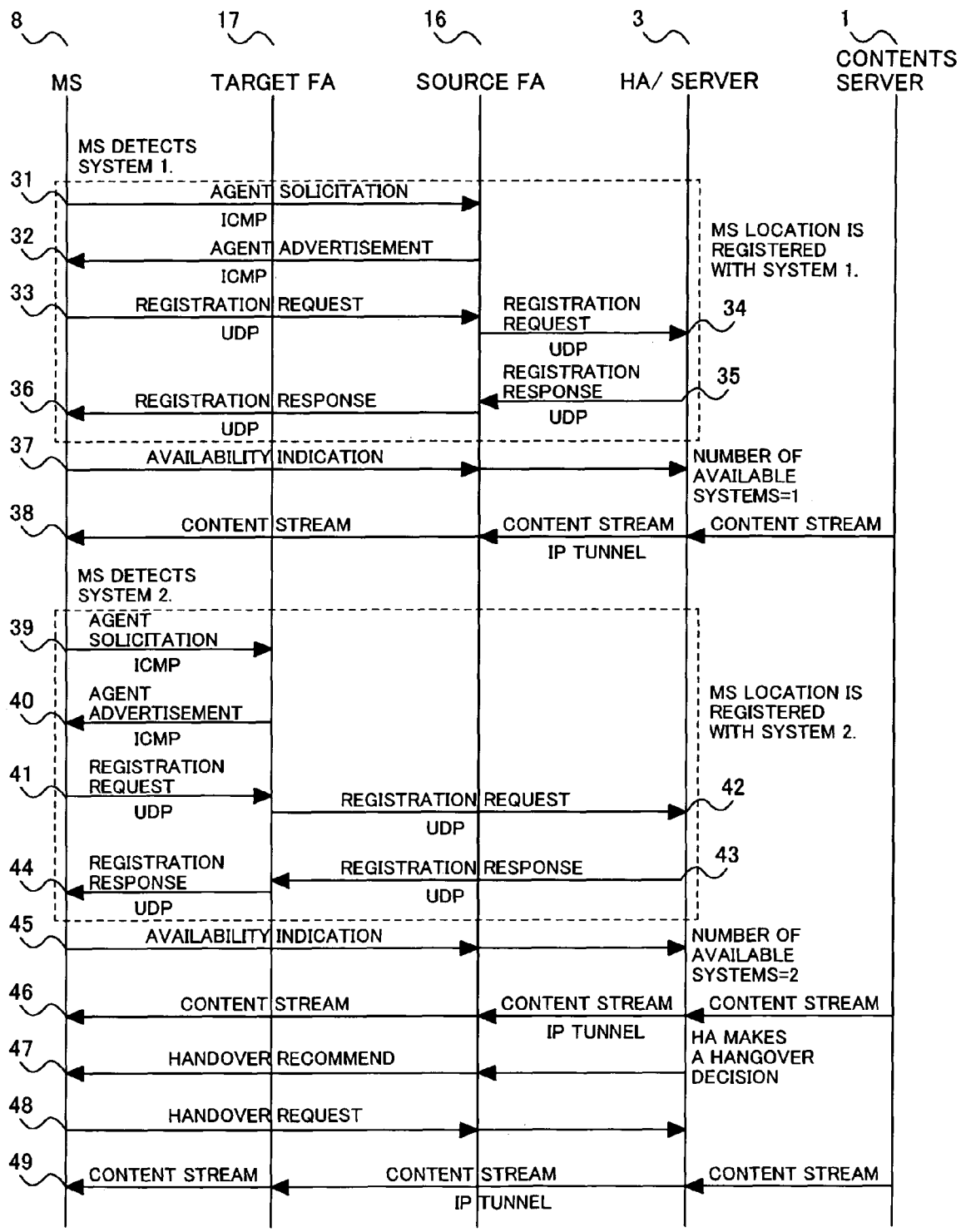
FIG. 3 illustrates an example of a handover procedure according to the present invention.

FIG. 3 illustrates an example of exchanging messages for a mobile station 8 handover according to the present invention. The handover is assumed to be performed, for instance, in the wireless system architecture shown in FIG. 1. In FIG. 3, if the mobile station 8 is handed over from a wireless LAN access point to a 1xEvDO access point, the Source FA 16 is a foreign agent 4 in the wireless LAN and the Target FA 17 is a foreign agent 6 in the 1xEvDO system. If the mobile station 8 is handed over from a 1xEvDO access point to a wireless LAN access point, the Source FA 16 is a foreign agent 6 and the Target FA 17 is a foreign agent 4.

When the mobile station 8 detects system 1 and determines that the system 1 is available, the mobile station 8 registers its location with the home agent 3 through exchange of messages 31, 32, 33, 34, 35, and 36. The mobile station determines that the system 1 is available, for example, if the strength of radio signals that the mobile station 8 receives from an access point of the system 1 exceeds a threshold value or if the mobile station receives a beacon signal transmitted by an access point. Or the mobile station may determine so if it has detected that an error ratio of data is equal to or less than a predetermined value by checking a CRC or similar code included in every packet that the mobile station received from an access point in the system 1. The mobile station 8 retains the number of systems determined available and the system identifier or the systems' identifiers and transmits an Availability indication 37 to the home agent 3 to notify the home agent of the number of systems determined available and the system identifier or the systems' identifiers. Here, the system identifier is, for example, the MAC address of a wireless interface. In the situation where only the system 1 is available, the home agent 3 forwards contents 38 via the foreign agent 16 to the mobile station 8.

When the mobile station 8 detects system 2 and determines that the system 2 is available, the mobile station 8 registers its location with the home agent 3 through the foreign agent 17 through exchange of messages 39, 40, 41, 42, 43, and 44. To notify the home agent 3 that the first and second systems are available and of the identifiers of these systems, the mobile station 8 transmits an Availability indication 45 to the home agent 3 through the system 1. The mobile station 8 is communicating with the contents server 1, using one of the plurality of systems with which its location has been registered. From the contents server, no packets are sent to a system with which the mobile station location has been registered, but which is now out of service, and this system stands by for serving the mobile station after a handover to it that may occur later. The home agent 3 continues to forward contents 46 via the foreign agent 16 to the mobile station 8.

In the situation where the plurality of systems are available, the home agent 3 determines an optimal system to which the mobile station should be handed over and recommends the mobile station 8 a handover by transmitting a Handover recommend 47 to the mobile station. If the mobile station 8 determines to execute a handover from the system 1 to the system 2, then the mobile station 8 transmits a Handover request 48 to the home agent 3. If the mobile station 8 determines not to execute the handover, even upon receiving the Handover recommend 47, the mobile station 8 does not transmit the Handover request 48. In response to the Handover request 48, the home agent 3 reroutes the packet transmission path from the route via the foreign agent 16 to an alternative route via the foreign agent 17. The home agent 3 forwards contents 49 via the foreign agent 17 and through the system 2 to the mobile station 8.

The home agent 3 notifies the mobile station 8 of an optimal system to which the mobile station should be handed over by the Handover recommend 47; instead, the mobile station may obtain this information in such a way that, in response to a request from the mobile station, the home agent 3 transmits this information to the mobile station. In this case, for example, it may be preferable that the mobile station periodically receives the information equivalent to the Handover recommend 47. However, the manner of the notification in which the home agent 3 sends the mobile station the Handover recommend 47 involves less delay, because the optimal system notification is sent to the mobile station just when a handover becomes advisable as circumstances demand, and avoids redundant periodical sending of same information.

The mobile station 8 owned by a user who is charged for a packet fee finally decides whether or not to connect to the system recommended by the Handover recommend 47. If connecting to the system, the mobile station 8 transmits the Handover request. To save the user the trouble of input operation and prevent missing an opportunity of connection, the handover-related operation of the mobile station can be facilitated so that the user may not make the decision to connect to the recommended system and perform input operation whenever receiving the Handover recommend 47. This may be done, for example, in the following manner: the user may enter a policy (such as, for example, preferentially using the wireless LAN system for IP packet communication) to the mobile station 8 beforehand so that the control unit of the mobile station 8 determines to execute a handover in accordance with the policy and automatically transmits the Handover request 48.

The mobile station 8 may execute the handover passively, triggered by the Handover recommend 47, or may do actively by transmitting the Handover request 48 by its discretion even if it does not receive the Handover recommend 47. Alternatively, both the mobile station 8 and the home agent 3 may actively initiate the handover execution. For example, the mobile station 8 makes the decision to execute a handover, using a rapidly changing parameter such as radio condition and transmits the Handover request to initiate the handover, whereas the home agent 3 determines a system to which the mobile station should be handed over, using a slow changing parameter such as the number of users accommodated by an access point, and notifies the mobile station of that system by the Handover recommend. When the mobile station transmits the Handover request 48 to initiate the handover, the identifier of a wireless interface to which the mobile station 8 is switching is specified in the Handover request 48 and this interface is referred to as an in-service medium. Or, if only one system is available for the mobile station 8, the identifier of the available system's wireless interface of the mobile station 8 is also referred to as the in-service medium. For example, in FIG. 3, when the mobile station 8 transmits the Availability indication 37, only the system 1 is available for the mobile station 8. At this point of time, the identifier of the system 1 wireless interface of the mobile station 8 is the in-service medium. Even if the in-service medium is determined, communication condition depends on the presence of datagrams to be transmitted and packet communication is not always performed by way of the in-service medium.

FIG. 19 illustrates an example of exchanging messages for a mobile station 8 handover according to prior art. The handover is assumed to be performed, for instance, in the wireless system architecture shown in FIG. 1. In FIG. 19, if the mobile station 8 is handed over from a wireless LAN access point to a 1xEvDO access point, the Source FA 16 is a foreign agent 4 in the wireless LAN and the Target FA 17 is a foreign agent 6 in the 1xEvDO system. If the mobile station 8 is handed over from a 1xEvDO access point to a wireless LAN access point, the Source FA 16 is a foreign agent 6 and the Target FA 17 is a foreign agent 4.

When the mobile station 8 detects system 1 and determines that the system 1 is available, the mobile station 8 registers its location with the home agent 3 through exchange of messages 31, 32, 33, 34, 35, and 36. The mobile station determines that the system 1 is available, for example, if the strength of radio signals that the mobile station 8 receives from an access point of the system 1 exceeds a threshold value or if the mobile station receives a beacon signal transmitted by an access point. Or the mobile station may determine so if it has detected that an error ratio of data is equal to or less than a predetermined value by checking a CRC or similar code included in every packet that the mobile station received from an access point in the system 1.

The mobile station 8 communicates with the contents server 1 via the Source FA 16 in the system with which its location has been registered. The home agent 3 continues to forward contents 38 via the foreign agent 16 to the mobile station 8.

When the mobile station 8 detects system 2 and determines that the system 2 is available, the mobile station 8 registers its location with the home agent 3 through the foreign agent 17 through exchange of messages 39, 40, 41, 42, 43, and 44. The home agent 3 reroutes the packet transmission path from the route via the foreign agent 16 to an alternative route via the foreign agent 17. The home agent 3 forwards contents 49 via the foreign agent 17 and through the system 2 to the mobile station 8.

In the prior art method, when a need for handover arises as communication condition changes, the mobile terminal makes a decision to execute a handover and then the messages 39, 40, 41, 42, 43, and 44 are exchanged between the mobile station 8 and the home agent 3 for mobile station location registration, followed by packet transmission path rerouting.

On the other hand, in the present invention, each time the mobile terminal detects an available system, its location is registered (through the messages 31-16 and 39-44) and the home agent 3 is notified beforehand of information about available systems (through the messages 37 and 45), and thus the home agent 3 acquires beforehand information about the systems to which the mobile station can be handed over. Accordingly, when a need for handover arises, a handover procedure can be executed through exchange of the Handover recommend 47 and Handover request 48 messages and the like. Therefore, after the mobile terminal makes the handover decision, the packet transmission path can be rerouted substantially in a round-trip time of the messages 47 and 48. Or, in the present invention, after the mobile terminal makes the handover decision, the packet transmission path can be rerouted substantially in the time taken for transmission of the message 48. Because the handover method of the present invention can cut the time required for mobile terminal location registration, typically a few seconds, the handover or rerouting time can be reduced to typically a few hundred milliseconds, substantially equivalent to the round-trip time of the above messages.

Figure 4:
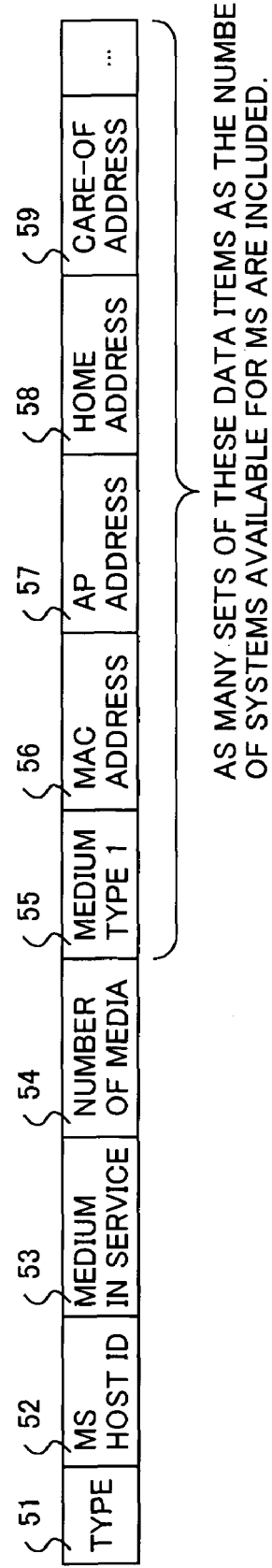
FIG. 4 shows a message format example according to the present invention.

FIG. 4 shows a message format of the Availability indication 37, 45. Field, Type 51 contains a code indicating that the message is Availability indication. Field, MS host ID 52 contains a uniquely assigned identifier of the mobile station 8 within the system shown in FIG. 1. Field, In-service Medium 53 contains the identifier (MAC address) of a wireless interface that the mobile station 8 is now using. Field, Number of Media 54 contains the number of available systems with which the mobile station 8 has registered its location. In addition, this message includes the following data items 55, 56, 57, 58, and 59 that are as many as the number specified in the number of media 54 field. Field, Medium Type 55 includes at least a value representing the type (wireless LAN, 1xEvDO, etc.) of system 1. Field, MAC Address 56 includes at least the MAC address of the system 1 interface of the mobile station 8. Field, AP Address 57 includes at least the MAC address of a system 1 access point to which the mobile station 8 is connecting. Field, Home Address 58 includes at least the home address of the mobile station 8 in the system 1. Field, Care-of address 59 includes at least the care-of address of the mobile station 8 in the system 1. The care-of address 59 is included in the Agent Advertisement transmitted by the foreign agent and posted to the mobile station 8. If the system 2 and subsequent systems are available, the above data items 55, 56, 57, 58, and 59 thereof are stored, following those for the system 1, in the above fields.

After the mobile station 8 registers its location with a system or detects availability status change of a system, it transmits an Availability indication to the home agent 3 through the system to which it is now connecting. When the mobile station 8 detects that a system has become unavailable, it t sends the home agent 3 an Availability indication message in which the number of media 54 is decremented by 1 and the data items for the unavailable system are removed. If the mobile station 8 becomes unable to continue communication using the in-service media due to status change, the mobile station 8 selects a system to which it should be handed over from the available systems and transmits a Handover request to the home agent, using the wireless interface of an available system. In response to the Handover request 48, the home agent 3 reroutes the packet transmission path. Then, the mobile station 8 transmits an Availability indication that reflects the system availability status change to the home agent 3. The mobile station 8 sends the home agent the Availability indication message in which the in-service medium field contains the identifier of the wireless interface of the system to which it should be handed over, as specified in the Handover request, the number of media 54 is decremented by one, and the data items for the unavailable system are removed.

The home agent 3 registers the contents of the Availability indication message into an MS management table. FIG. 9 shows an example of the MS management table. On each row, the following data for a mobile station is stored. Column, MS host ID 121 stores the identifier of the mobile station. Column, In-service Medium 121 stores the identifier (MAC address) of the system that the mobile station is now using. Column, Number of Media 123 stores the number of available systems with which the mobile station has registered its location. Column, Media Type 124 stores at least the value representing the type (wireless LAN, 1xEvDO, etc.) of system 1 for the mobile station. Column, MAC Address 125 stores at least the MAC address of the system 1 interface of the mobile station. Column, AP Address 126 stores at least the MAC address of a system 1 access point to which the mobile station is connecting. Column, Home Address 127 stores at least the home address of the mobile station in the system 1. Column, Care-of address 128 stores at least the care-of address of the mobile station in the system 1. The above data items 124, 125, 126, 127, and 128 as many as the number specified in the number of media 123 column are registered.

The home agent 3 collects network data and registers this data into a table. A protocol for data collection may be, for example, a Simple Network Management Protocol (SNMP) or a particular protocol. As such data that the home agent 3 manages, FIG. 10 shows an example of data collected from the access points of the wireless LAN system and FIG. 11 shows an example of data collected from the access points of the 1xEvDO system. In the table of FIG. 10, on each row, the following data for a wireless LAN access point is stored. Column 101 stores the identifier (MAC address) of the wireless LAN access point. Columns 102, 103, 104, and so on respectively store the identifiers (MAC addresses) of the wireless LAN interfaces of the mobile stations that the access point accommodates. Column 105, 106, 107, and so on respectively store radio signal strength values measured at the access point for the radio signals from each mobile station. For example, in FIG. 10, an access point with the identifier of AP ID W1 accommodates mobile stations MS ID W11, MS ID W12, MS ID W13, etc. and the measured values of the strength of received signals from these mobile stations, namely, Received Signal Strength Indicator (RSSI) are RSSI W11, RSSI W12, RSSI W13, etc. The table may have an additional column for the number of mobile stations accommodated by each access point.

Likewise, in the table of FIG. 11, on each row, the following data for a 1xEvDO access point is stored. Column 111 stores the identifier (MAC address) of the 1xEvDO access point. Columns 112, 113, 114, and so on respectively store the identifiers (MAC addresses) of the 1xEvDO interfaces of the mobile stations that the access point accommodates. For example, in FIG. 11, an access point with the identifier of AP ID E1 accommodates mobile stations MS ID E11, MS ID E12, MS ID E13, etc. and the carrier-to-interference ratio (C/I) values for radio signals from these mobile stations are C/I E11, C/I E12, C/I E13, etc. The table may have an additional column for the number of mobile stations accommodated by each access point.

When the home agent 3 receives an Availability indication message from a mobile station, it refers to the table of FIG. 10 or FIG. 11 for the medium type 55 specified in the message and can look up the data for the access point to which the mobile station 8 is connecting. For example, the home agent 3 looks up an access point specified in the AP address 57 field of the message from the column 101 or 111 of the table and can know the identifiers of the mobile stations 112, 113, 114, etc. that the access point accommodates or the number of mobile stations accommodated from the column for the number of mobile stations accommodated by each access point if this column exists. For example, assume that, from the identifiers of the mobile stations 112, 113, 114, etc. that the access point accommodates, the home agent 3 finds one 112 that matches with a MAC address 56 specified in the Availability indication message. By referring to the measured value 115 for the mobile station identifier 112, the home agent can know the quality (for example, received signal strength) of a communication channel from the mobile station 8 at the access point to which the mobile station 8 that transmitted the Availability indication is connecting.

Figure 7:
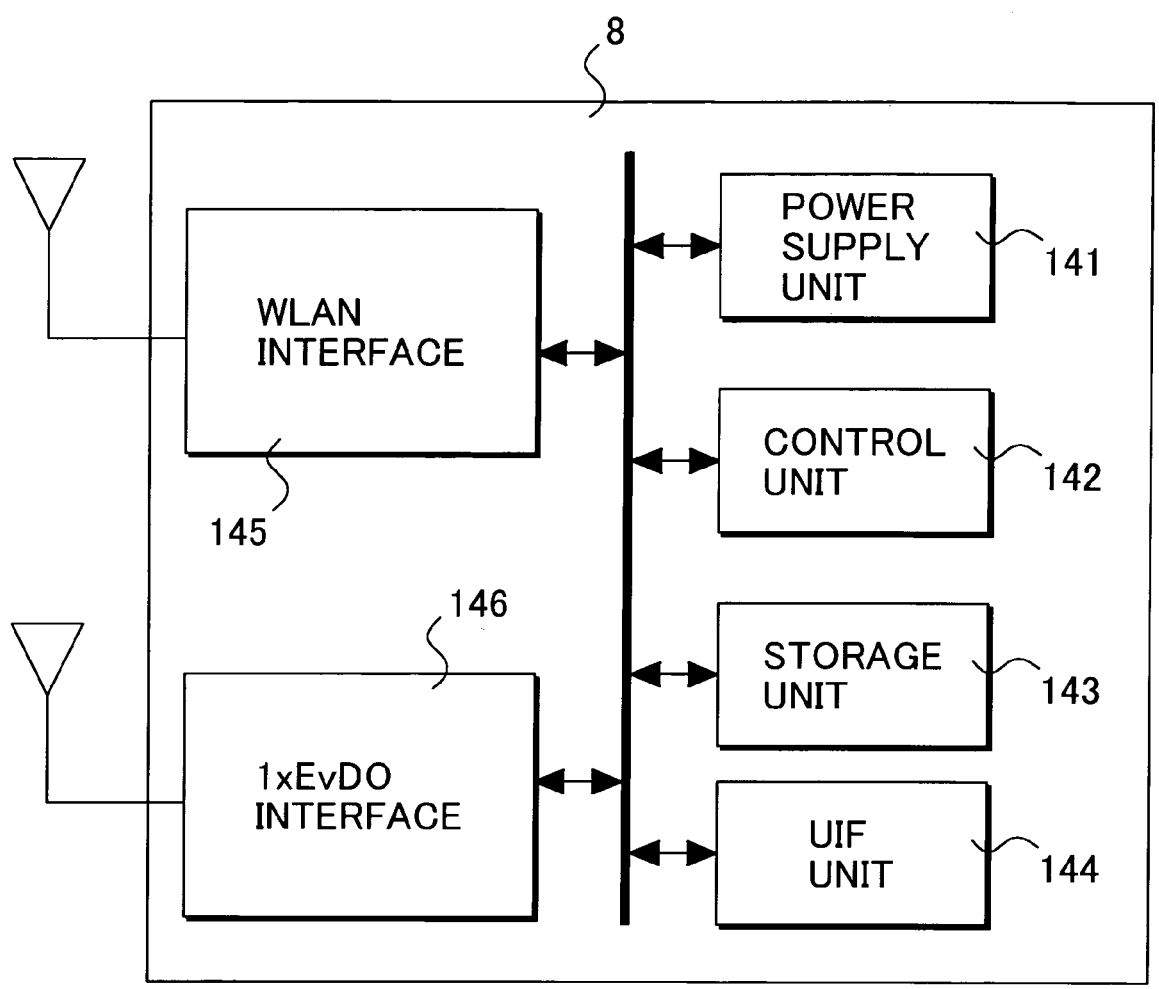
FIG. 7 shows a mobile station configuration example according to the present invention.

FIG. 7 shows a configuration example of the mobile station 8 according to the present invention. A control unit 142 exerts control over components 141, 143, 144, 145, and 146 and transmitting and receiving the messages mentioned in FIG. 3 and other processing. The control unit 142 determines whether a wireless LAN interface 145 and a 1xEvDO interface 146 can be put in service from the conditions of communication channels between the mobile station and the access points of each system. A storage unit stores control data for the control unit 142, data entered via a UIF unit 144, and data input through the interfaces 145 and 146. The UIF unit 144 consists of user interface devices such as a keyboard, display, etc. The wireless LAN interface 145 sends and receives data to/from the wireless LAN access points 9, 10, 11. The 1xEvDO interface 146 sends and receives data to/from the 1xEvDO access points 12, 13, 14. In an Availability indication message, the MAC address of the wireless LAN interface 145 or 1xEvDO interface 146 is stored in the MAC address 56 field associated with medium type 55 and AP address 57 in a set of data items for an available system detected. Although the mobile station is equipped with the two interfaces, wireless LAN interface 145 and 1xEvDO interface 146, is shown by way of example in FIG. 7, the mobile station 8 may be equipped with three or more wireless interfaces.

Figure 8:
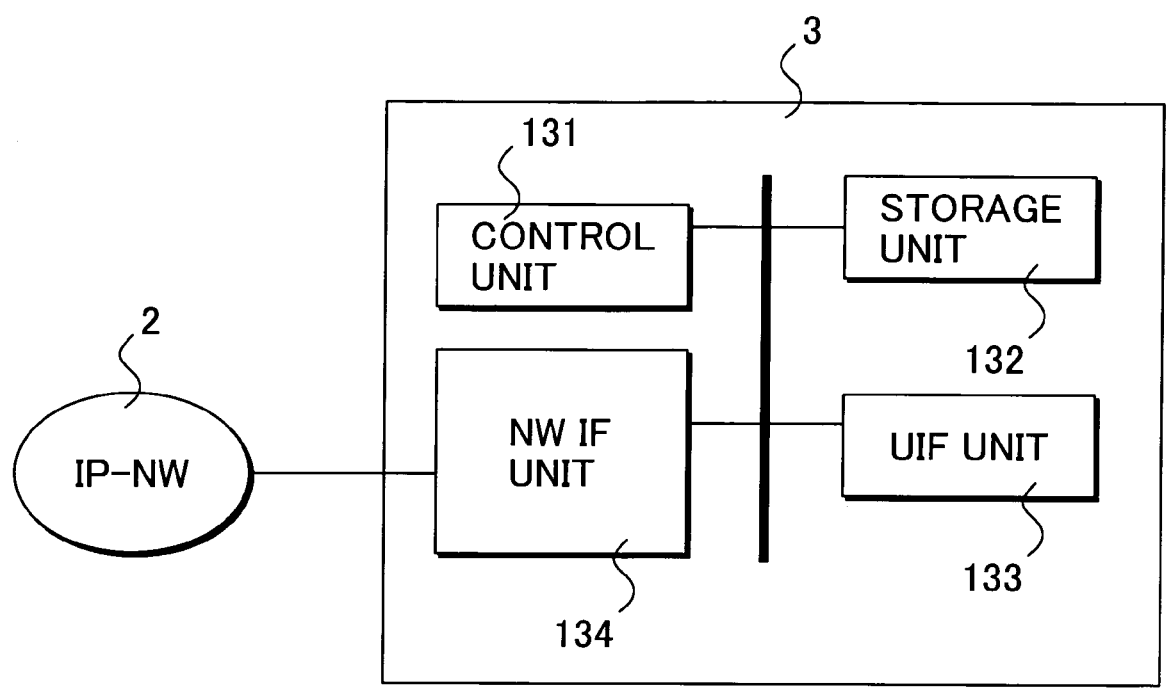
FIG. 8 shows a server configuration example according to the present invention.
Figure 14:
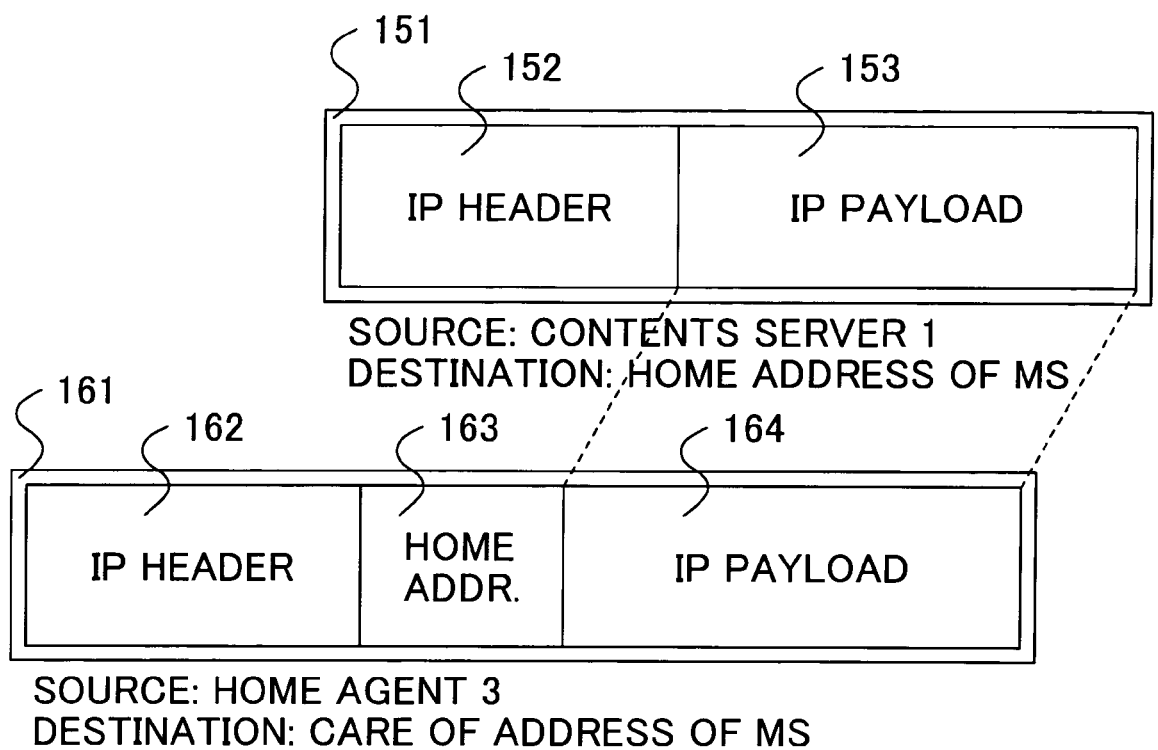
FIG. 14 shows a packet encapsulation format example conforming to a conventional encapsulation method.
Figure 15:
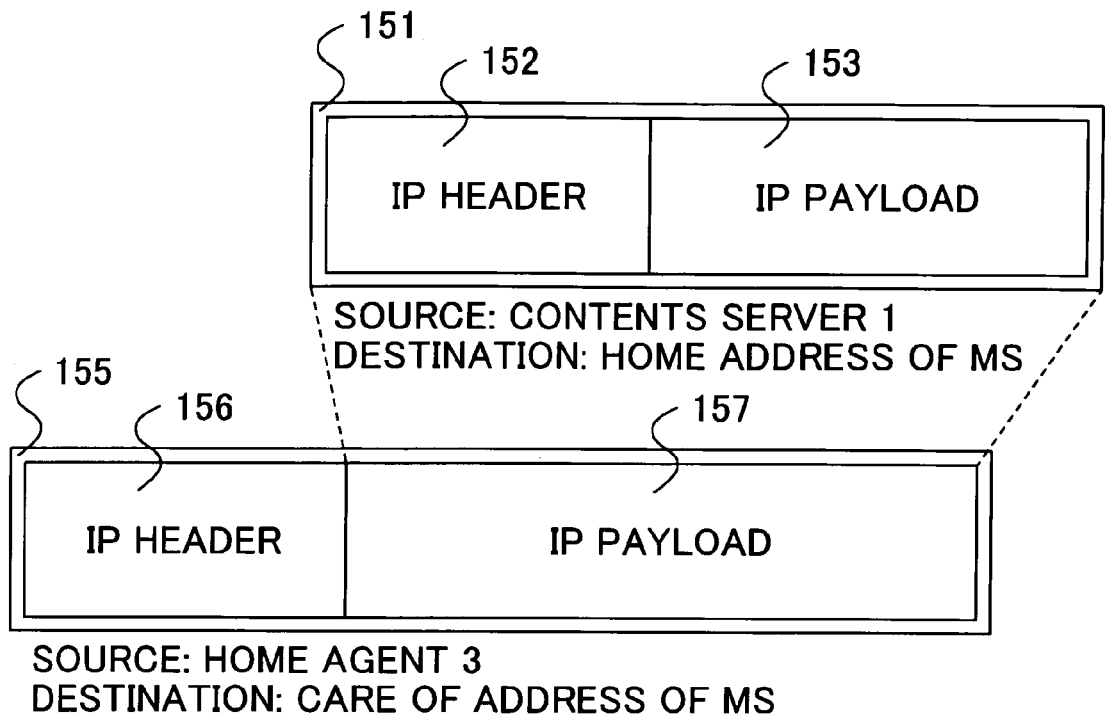
FIG. 15 shows a packet encapsulation format example conforming to a conventional encapsulation method.

FIG. 8 shows a configuration example of a server as the home agent 3 according to the present invention. A control unit 131 exerts control over components 132, 134, 133, table data entry and search, transmitting and receiving the messages mentioned in FIG. 3, and other processing. A storage unit 132 stores the tables that are shown in FIGS. 11, 12, and 13. A UIF unit 133 consists of user interface devices such as a keyboard, display, etc. An NW IF unit 134 is a network interface for the home agent 3 to interface with the IP network. An example of how the home agent 3 updates the management table will be discussed below. When an packet 151 is input to the NW IF unit 134, the control unit 131 checks the destination address included in the IP header 152. If the destination address is the IP address of the home agent 3, the control unit 131 checks data contained in the IP payload 153. If a given field of the IP payload 153 contains the code indicating Availability indication, the control unit 131 determines that an Availability indication message is stored in the IP payload 153. The control unit 131 looks for an MS host ID 52 specified in the Availability indication message from the MS host ID 121 column of the MS management table stored in the storage unit 132. If the MS host ID 52 is not found, the control unit 131 adds the MS host ID 52 to the MS management table and copies the contents of the subsequent fields 53, 54, 55, 56, 57, 58, and 59 of the Availability indication message into the corresponding columns 122, 123, 124, 125, 126, 127, and 128 on the added row. If the MS host ID 52 is found, the control unit 131 copies the contents of the subsequent fields 53, 54, 55, 56, 57, 58, and 59 of the Availability indication message into the corresponding columns 122, 123, 124, 125, 126, 127, and 128 on the row of the MS host ID 121.

An example of how the control unit 131 of the home agent 3 determines a system to which the mobile station should be handed over will be discussed below. If there are a plurality of available systems, as indicated in the Availability indication message, then the control unit 131 determines on optimal system. If the number of available systems is one, the home agent 3 uses the available system. Now assume that wireless LAN is specified as the first medium type 55 and 1xEvDO as the second medium type 55 in the Availability indication message.

In general, a wireless LAN access point allocates data transmission time slots to mobile stations that it serves by Carrier Sense Multiple Access with Collision Avoidance (CSMA/CA) and a 1xEvDO access point does so by transmission scheduling. It does not happen that only a particular mobile station occupies transmission time slots and, basically, the time slots are evenly allocated to the mobile stations. Communication time allocated to one mobile station is considered to be the time divided by the number of the mobile stations accommodated by the access point.

The data communication rate of a wireless LAN channel varies, depending on RSSI, and the data communication rate of a 1xEvDO channel varies, depending on C/I, and both are expressed as the functions of RSSI and C/I, respectively. Thus, the wireless LAN and 1xEvDO channel data rates are represented by DRw(RSSI) and DRe (C/I), respectively.

An effective data rate of a wireless LAN channel is calculated by equation 1 and an effective data rate of a 1xEvDO channel is calculated by equation 2. In equation 1, Nw is the number of mobile stations accommodated by a wireless LAN access point. In equation 2, Ne is the number of mobile stations accommodated by a 1xEvDO access point. Nw and Ne can be obtained from the tables stored in the storage unit 132. Now assume that the first MAC address 56 specified in the Availability indication 45 message is MS ID W11. First, retrieve a measured value of RSSI W11 from the table of FIG. 10 and get DRw(RSSI W11). The number of the identifiers of the mobile stations including the MS ID W11, 102, 103, 104, etc. accommodated by the access point AP ID W1 is Nw. By dividing DRw(RSSI W11) by Nw, a value of effective data rate Rw of the wireless LAN channel is obtained.

Now assume that the second MAC address 56 specified in the Availability indication 45 message is MS ID E21. Retrieve a value of C/I E21 from the table of FIG. 10 and get DRe (C/I E21). The number of the identifiers of the mobile stations including the MS ID E21, 112, 113, 114, etc. accommodated by the access point AP ID E2 is Ne. By dividing DRe(C/I E21) by Ne, a value of effective data rate Re of the 1xEvDO channel is obtained.

$$Rw = DRw(RSSI)/Nw \qquad \text{[Equation 1]}$$

$$Re = DRe(C/I)/Ne \qquad \text{[Equation 2]}$$

The control unit 131 compares the value of Rw calculated by using the first MAC address 56 and the value of Re calculated by using the second MAC address 56 for the mobile station 8 identified by the MS host ID 52 in the Availability indication 45 message. The control unit 131 determines which system is optimal by which channel is a greater effective data rate and regards the thus determined system as an in-service medium for the mobile station 8 identified by the MS host ID 52. If Re is greater than Rw, the control unit 131 regards 1xEvDO as the in-service medium. If Rw is greater than Re, the control unit 131 regards wireless LAN as the in-service medium.

If the system selected in the manner described above differs from the in-service system 122 for the mobile station in the MS management table, the control unit 131 transmits a handover recommend 47 to the mobile station 8. FIG. 5 shows a message format example of the handover recommend. Field, Type 61 contains a code indicating that the message is handover recommend. Field, MS host ID 62 contains the identifier of the mobile station 8 as the destination of the message. Field, In-service Medium 63 contains the type of the system that the mobile station 8 is using. Field, Medium Type 64 contains the type of the recommended system to which the mobile station should be handed over. Field, MAC Address 65 contains the MAC Address of the recommended system to which the mobile station should be handed over. For example, if the control unit 131 has selected 1xEvDO as the system to which the mobile station should be handed over, then the control unit 131 creates a handover recommend message in which 1xEvDO is set in the medium type 64 field and the MAC address 56 of the system 2 specified in the Availability indication 45 is set in the MAC address 65 field.

If the mobile station 8 accepts the recommended system in the handover recommend 47 and determines to execute the handover to that system, the mobile station 8 transmits a handover request 48 to the home agent 3. FIG. 6 shows a message format example of the handover request. Field, Type 71 contains a code indicating that the message is handover request. Field, MS host ID 72 contains the identifier of the mobile station 8 as the source of the message. Field, In-service Medium 73 contains the type of a wireless interface that the mobile station 8 is now using. Field, Medium Type 74 contains the type of the system to which the mobile station should be handed over. Field, MAC Address 75 contains the MAC address of a wireless interface for the system to which the mobile station should be handed over. Field, Home Address 76 contains the home address of the mobile station 8 associated with the wireless interface for the system to which the mobile station should be handed over. Field, Care-of address 77 contains the care-of address of the mobile station 8 associated with the wireless interface for the system to which the mobile station should be handed over. Upon receiving the handover request, the home agent 3 sets the MAC address 75 to replace the entry for the mobile station in the in-service medium 122 column of the MS management table.

The contents server 1 transmits packets to the home address of the mobile station 8 and the home agent 3 performs packet transmission control to forward the packets via an optimal system. An example of how the server as the home agent 3 performs this control. The control unit 131 checks the destination address included in the IP header 152 of an IP packet 151 input from contents server 1 to the NW IF unit 134. If the destination address is any of the home addresses 58 of the mobile station 8 for a plurality of available systems, the control unit 131 encapsulates the IP packet 151.

If the encapsulation method conforming to RFC2003 is applied, the control unit 131 first changes the destination address in the IP header 152 to the home address of the mobile station 8 for the in-service system. The home address for the in-service system is obtained in the following way: from the MAC address 125 entries for the plurality of systems for the mobile station 8 in the MS management table, look up one that matches with the in-service system 122 entry and refer to the home address 127 entry for the same system. If the destination address stored in the IP header 152 of the received IP packet 151 matches the destination address retrieved from the MS management table, the IP header 152 need not be changed. Moreover, the control unit 131 adds an IP header 156 to the IP packet with its destination address changed. In the IP header 156, the IP address of the home agent 3 is specified as the source address and the care-of address in the in-service system 122 is specified as the destination address. The care-of address in the in-service system is obtained in the following way: from the MAC address 125 entries for the plurality of systems for the mobile station 8 in the MS management table, look up one that matches with the in-service system 122 entry and refer to the care-of address 128 entry for the same system. Then, the control unit 131 transmits the thus encapsulated IP packet through the NW IF unit 134.

If the encapsulation method conforming to RFC2004 is applied, the control unit 131 adds an IP header 162 and an address 163 to the IP payload 153. The address 163 is the home address of the mobile station 8 for the in-service system. The home address for the in-service system is obtained in the following way: from the MAC address 125 entries for the plurality of systems for the mobile station 8 in the MS management table, look up one that matches with the in-service system 122 entry and refer to the home address 127 entry for the same system. In the IP header 162, the IP address of the home agent is specified as the source address and the care-of address in the in-service system 122 is specified as the destination address. The care-of address in the in-service system is obtained in the following way: from the MAC address 125 entries for the plurality of systems for the mobile station 8 in the MS management table, look up one that matches with the in-service system 122 entry and refer to the care-of address 128 entry for the same system. Then, the control unit 131 transmits the thus encapsulated IP packet through the NW IF unit 134.

Figure 16:
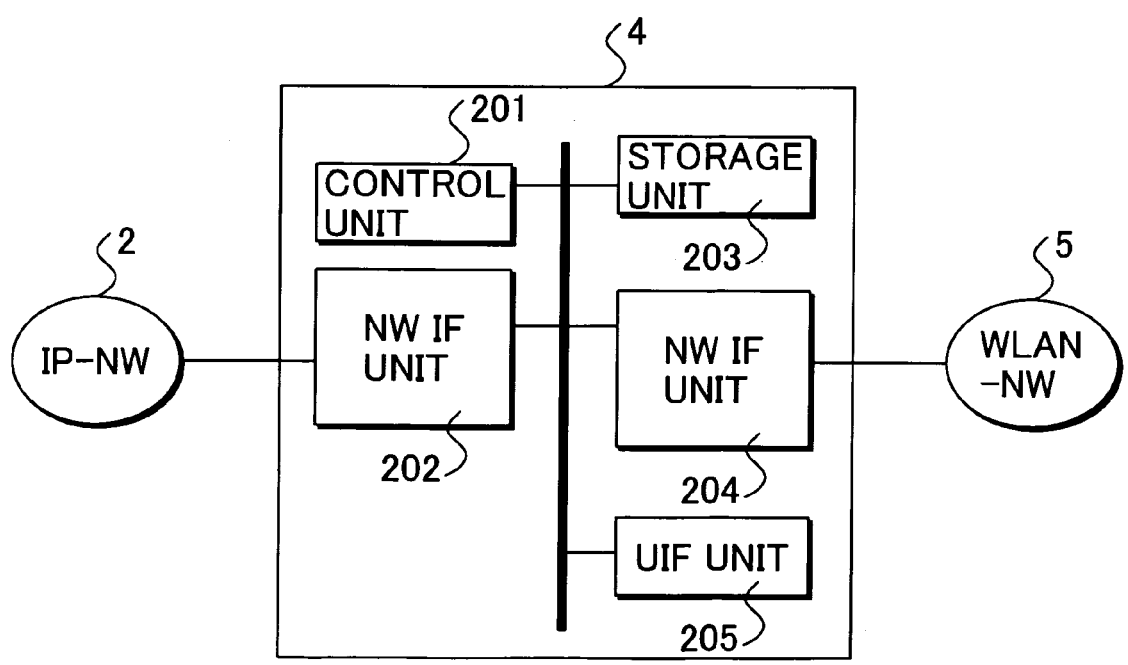
FIG. 16 shows a foreign agent configuration example according to the present invention.

The contents server 1 need not know the optimal system for the mobile station 8. The contents server 1 only transmits packets to the home address of the mobile station 8 and then the home agent 3 performs control to forward the packets via the optimal system. In the following, an example of the home agent 3 operations will be discussed; that is, collecting managerial data from foreign agents and selecting a wireless interface, based on the data received from the mobile station through the above messages and the managerial data. FIG. 16 shows a foreign agent 4 configuration example. An NW IF unit 202 is a network interface for the foreign agent to interface with a network 2. An NW IF unit 104 is a network interface for the foreign agent 4 to interface with a network 5. A control unit 201 performs packet transmission path routing, referring to table data stored in a storage unit 203. The storage unit 203 stores tables for packet transmission path routing and statistics data for network management. A UIF unit 205 consists of user interface devices such as a keyboard, display, etc. Assume that the NW IF units 202, 204 are Ethernet® (a registered trademark of Xerox Corporation) adapters compliant with the IEEE802.3 standard.

FIG. 17 shows a packet format example of packets that are input and output through the NW IF units 202, 204. Reference numeral 180 denotes an Ethernet® packet, 181 denotes the header part of the Ethernet® packet, and 182 denotes the data part of the Ethernet® packet. Reference numeral 183 denotes the Frame Check Sequence (FCS) part of the Ethernet® packet, wherein the FCS code is used to detect a packet data error. The header part 181 is a control information part including a destination address 185 and a source address 186. The IP packet 151 is stored in the data part 182.

When the NW IF unit 202 receives a packet 180 from the network 2, the control unit 201 parses the destination address 185. If the destination address 185 is the MAC address of the NW IF unit 202, the control unit checks the packet 180 data for an error, using the FCS. The control unit 201 counts up the number of packets 180 received by the NW IF unit 202 and stores the number of received packets into a given register in the storage unit 203. If the packet 180 data is free from an error, the control unit 201 processes the IP packet 151 stored in the data part 182, according to the Internet Protocol. If, for example, the data stored in the data part 182 consists of an encapsulated IP packet 155 or 161, the control unit 201 parses the destination address included in the associated IP header 156 or 162. If the destination address (care-of address) in the IP header 156 or 162 is the IP address of the NW IF unit 202 of the foreign agent 4, the control unit 201 decapsulates the IP packet 151 from the encapsulated IP packet 155 or 161. Then, the control unit 201 executes transmission path finding to the destination address of the IP packet 151, referring to, for example, the table for packet transmission path routing stored in the storage unit 132.

If a transmission path from the NW IF unit 204 to the destination address has been found by the path finding, the control unit 201 constructs an Ethernet® packet 180 into which the IP packet 151 is stored and transmits that packet through the NW IF unit 204. If the path finding result is no path to the destination address of the IP packet 151, the control unit 201 discards the IP packet 151. The control unit 201 executes transmission path finding to the destination address of the IP packet 155 or 161, referring to the table for packet transmission path routing stored in the storage unit 132. If a packet 180 data error is detected, the control unit 201 counts up the number of packets including errors and stores that number into a given register in the storage unit 203. The control unit 201 discards packets 180 including errors, counts up the number of discarded packets, and stores that number into a given register in the storage unit 203. Moreover, the control unit 201 calculates a packet discard ratio by dividing the number of discarded packets by the number of received packets and stores this ratio into a given register in the storage unit 203.

When the NW IF unit 204 receives a packet 180 from the network 5, the control unit 201 parses the destination address 185. If the destination address 185 is the MAC address of the NW IF unit 204, the control unit checks the packet 180 data for an error, using the FCS. The control unit 201 counts up the number of packets 180 received by the NW IF unit 204 and stores the number of received packets into a given register in the storage unit 203. If the packet 180 data is free from an error, the control unit 201 processes the IP packet 151 stored in the data part 182, according to the Internet Protocol.

The control unit 201 executes transmission path finding to the destination address of the IP packet 151, referring to, for example, the table for packet transmission path routing stored in the storage unit 132. If a transmission path from the NW IF unit 202 to the destination address has been found by the path finding, the control unit 201 constructs an Ethernet® packet 180 into which the IP packet 151 is stored and transmits that packet through the NW IF unit 202. If the path finding result is no path to the destination address of the IP packet 151, the control unit 201 discards the IP packet 151. If a packet 180 data error is detected, the control unit 201 counts up the number of packets including errors and stores that number into a given register in the storage unit 203. The control unit 201 discards packets 180 including errors, counts up the number of discarded packets, and stores that number into a given register in the storage unit 203. Moreover, the control unit 201 calculates a packet discard ratio by dividing the number of discarded packets by the number of received packets and stores this ratio into a given register in the storage unit 203.

The home agent 3 collects parametric data of network condition and registers such data into a table. A protocol for data collection may be, for example, the SNMP or a particular protocol. As such data that the home agent 3 manages, FIG. 18 shows an example of the table of the data collected from foreign agents. FIG. 18 is a data table example assuming that there are a plurality of foreign agents 1 to L. In the table of FIG. 18, one each row, the following data for a foreign agent is stored. Column 191 stores the identifier of the NW IF unit of the foreign agent (the IP address of the NW IF unit 202). Column, packet error count 192 stores the number of packets including errors counted up by the control unit 201. Column, packet discard ratio 193 stores the packet discard ratio calculated by the control unit 201.

An example of how the control unit 131 of the home agent 3 determines a system to which the mobile station should be handed over will be discussed below. When the home agent is informed that a plurality of systems are available for the mobile station by the Availability indication message, it determines an optimal system. If only one system is available for the mobile station, the home agent 3 uses the available system. Assume that wireless LAN is specified as the first medium type 55 and 1xEvDO as the second medium type 55 in the Availability indication message that the home agent 3 received most recently. Also assume that the in-service medium 53 is wireless LAN. The control unit 131 learns the care-of address 59 in the system for which the MAC address 56 matches with the in-service medium 53 from the Availability indication. The thus learned care-of address 59 is the IP address of the foreign agent 4 of the in-service medium. The control unit 131 looks up the learned care-of address 59 from the foreign agent identifier 191 column of the table shown in FIG. 18. When the control unit 131 finds out the foreign agent identifier 191 matched with the learned care-of address 59 from the table, it learns the associated packet discard ratio 193. This packet discard ratio 193 is the packet discard ratio on the foreign agent 4. The control unit 131 compares the learned packet discard ratio with a threshold value. If the packet discard ratio is not less than a given value, the control unit 131 deselects the system using the foreign agent 4, that is, the wireless LAN system.

Now assume that the control unit 131 compares the packet discard ratio with a threshold value and the packet discard ratio exceeds the threshold value. Then, the control unit 131 sends the mobile station a handover recommend 47 message in which a 1xEvDO system type is set in the medium type 64 field and the MAC address of the 1xEvDO interface is set in the MAC address 65 field. FIG. 5 shows a message format example of the handover recommend. Field, Type 61 contains a code indicating that the message is handover recommend. Field, MS host ID 62 contains the identifier of the mobile station 8 as the destination of the message. Field, In-service Medium 63 contains the type of the system that the mobile station 8 is using. Field, Medium Type 64 contains the type of the recommended system to which the mobile station should be handed over. Field, MAC Address 65 contains the MAC Address of the recommended system to which the mobile station should be handed over. For example, if the control unit 131 has selected 1xEvDO as the system to which the mobile station should be handed over, then the control unit 131 creates a handover recommend message in which 1xEvDO is set in the medium type 64 field and the MAC address 56 of the system 2 specified in the Availability indication 45 is set in the MAC address 65 field. If the mobile station 8 accepts the recommended system in the handover recommend 47 and determines to execute the handover to that system, the mobile station 8 transmits a handover request 48 to the home agent 3. Upon receiving the handover request, the home agent 3 reroutes the packet transmission path from the LAN system to the 1xEvDO system.

While, in the above example, wireless interface selection is made by using the packet discard ratio as managerial data, packet error count, the number of packets received at network components, and the amount of data received per unit time may be used as the managerial data. While, in the above example, the home agents collects the managerial data from the foreign agents by way of example of network components, the network components may include routers, switches, and gateways.

An example of selecting a wireless interface to which the mobile station should be handed over, using authenticated status data per wireless interface, will be discussed below. FIG. 12 shows a message format example of Availability indication 37, 45. Field, Authenticated Status 60 contains data indicating that the particular type of wireless interface of the mobile station is authenticated by an authentication server that the communication service provider operates per available system. Normally, users and mobile stations to receive a service can make use of communication services only after being authenticated by the service provider. The authentication server is included in the network that the service provider operates, such as, for example, the specific types of networks 5 and 7. For example, as per the wireless LAN standard (IEEE 802.11), a mobile station is notified of its authenticated status by a control signal from an access point. After the mobile station 8 registers its location with a system or detects availability status change of a system, it transmits an Availability indication to the home agent 3 through the system to which it is now connecting. In addition to the above cases, when the mobile station 8 detects authenticated status change, it transmits an Availability indication with the authenticated status 60 updated to the home agent 3.

FIG. 13 shows a format example of the MS management table that the home agent 3 manages. Column, Authenticated Status 139, for example, stores data indicating that the particular type of wireless interface of each mobile station, identified by the MAC address 125, is authenticated by the authentication server that the communication service provider operates. An example of how the control unit 131 of the home agent 3 determines a wireless interface to which the mobile station should be handed over will be discussed below. When the home agent is informed that a plurality of wireless interfaces are available for the mobile station by the Availability indication message, it determines an optimal wireless system. If only one wireless interface is available for the mobile station, the home agent 3 uses the available wireless interface. Now assume that wireless LAN is specified as the first medium type 55 and 1xEvDO as the second medium type 55 in the Availability indication message The effective data rate Rw of a wireless LAN channel is calculated by equation 3 and the effective data rate Re of a 1xEvDO channel is calculated by equation 4. In equation 3, Waw is weight by the authenticated status of the wireless LAN interface. In equation 4, Wae is weight by the authenticated status of the 1xEvDO interface. The control unit 131 assigns a weight, referring to the authenticated status 129 in the MS management table. The weight is positive and an authenticated interface is assigned a greater weight than that not authenticated.

$$Rw = DRw(RSSI) * Waw/Nw \qquad \text{[Equation 3]}$$

$$Re = DRe(C/I) * Wae/Ne \qquad \text{[Equation 4]}$$

The control unit 131 calculates Rw and Re, based on the corresponding two MAC address 56 entries for the same MS host ID 52 in the Availability indication message and compares calculated Rw and Re. The control unit 131 determines which system is optimal by which channel is a greater effective data rate and selects the thus determined system as the system to which the mobile station 8 identified by the MS host ID 52 should be handed over. By using this method, an authenticated wireless interface is more likely to be selected and, consequently, the possibility of a delay due to an authentication process will be reduced.

If the system selected in the manner described above differs from the in-service system 122 for the mobile station in the MS management table, the control unit 131 transmits a handover recommend 47 to the mobile station 8. If the mobile station 8 accepts the recommended system in the handover recommend 47 and determines to execute the handover to that system, the mobile station 8 transmits a handover request 48 to the home agent 3. Upon receiving the handover request, the home agent 3 sets the MAC address 75 to replace the entry for the mobile station in the in-service medium 122 column of the MS management table.

In FIG. 13, for example, the Authenticated Status 129 column may store data indicating that the particular type of wireless interface of each mobile station, identified by the MAC address 125, is authenticated by the authentication server that the communication service provider operates and data identifying the type of an authentication process. In this case as well, the effective data rate Rw of a wireless LAN channel is calculated by equation 3 and the effective data rate Re of a 1xEvDO channel is calculated by equation 4, as described in the above example. In equation 3, Waw is weight by the authenticated status of the wireless LAN interface. In equation 4, Wae is weight by the authenticated status of the 1xEvDO interface. The control unit 131 assigns a weight, referring to the authenticated status 129 in the MS management table. The weight is positive and an authenticated interface is assigned a greater weight than that not authenticated. A type of an authentication process imposing a larger processing load on the network components or requiring a longer processing time is assigned a smaller weight. By using this method, a wireless interface that is authenticated for a shorter time is more likely to be selected and, consequently, the possibility of a delay due to an authentication process will be reduced.

What is claimed is:

1. A wireless communication system, comprising:
   a mobile station which includes a first wireless interface corresponding to a first wireless communication protocol and a second wireless interface corresponding to a second wireless communication protocol;
   a server connected to a network;
   a first access point coupled to the network and to report according to the first wireless communication protocol; and
   a second access point coupled to the network and to report according to the second wireless communication protocol;

wherein the first access point reports, to the server, a first communication information of a first wireless communication condition, wherein the first wireless communication condition comprises a radio condition between the first access point and the mobile station which has been accommodated by the first access point, the mobile station sends, to the server, a handover request to change communication path of the mobile station from the second access point to the first access point, the server determines whether to change communication path of the mobile station from the second access point to the first access point on the basis of the first communication information, and if it is determined to change the communication path from the second access point to the first access point, the server controls packet transmission path routing related to the mobile station for handover of the mobile station.

2. A wireless communication system according to claim 1, wherein:

the second access point reports, to the server, a second communication information of a second wireless communication condition related to the second wireless communication protocol, wherein the second wireless communication condition comprises a radio condition between the second access point and the mobile station which has been accommodated by the second access point, and the server compares between the first communication information and the second communication information to determine whether to change communication path and sends handover recommendation message to the mobile station on the result of the comparison.

3. A wireless communication system according to claim 2, wherein the first communication information includes at least one of packet discard ratios, packet error counts, a number of packets received at the access points, and an amount of data received per unit.

4. A wireless communication system according to claim 2, wherein the first communication information is related to a communication condition of communication between the first access point and a plurality of mobile stations which are accommodated by the first access point.

5. A wireless communication system according to claim 2, wherein the second communication information is related to communication condition between the second access point and a plurality of mobile stations which are accommodated by the second access point.

6. A wireless communication system according to claim 2, wherein the mobile station receives the handover recommendation message from the server, and determines whether to change from the second wireless network interface to the first wireless network interface on the basis of the handover recommendation message.

7. A wireless communication method in a network system including a first access point to report according to a first wireless communication protocol, a second access point to report according to a second wireless communication protocol and a server coupled to the first access point and the second access point, the method comprising the steps of:

providing, a mobile station, a first wireless communication network according to the first wireless communication protocol and a second wireless communication network according to the second wireless communication protocol;

collecting, by the server, a first information related to a condition of the first wireless communication network and a second information related to a condition of the second wireless communication network; and sending, by the server, to the mobile which is accommodated by either the first access point or the second access point, a handover recommendation request to recommend handover between the first wireless communication network and the second wireless communication network on the basis of the first information and the second information.

8. A wireless communication method according to claim 7, further comprising the step of:

sending, a handover request, by the mobile station, to either the first access point or the second access point, wherein the handover request is for handing over the mobile station between the first access point and the second access point.

9. A wireless communication method according to claim 7, wherein if a condition of a wireless network provided by an access point which has not accommodated the mobile station is better than that of a wireless network provided by an access point which has accommodated the mobile station, then the method further comprises the step of determining, by the server, to send a handover recommendation message to the mobile station.

10. A mobile station comprising:

a first wireless network interface operably associated with a first wireless network, the first wireless network having a first access point coupled to a server via a network;

a second wireless network interface operably associated with a second wireless network, the second wireless network having a second access point coupled to the server via the network;

a control unit which is coupled to the first wireless network interface and the second wireless network interface, and which communicates via the first wireless network interface to the first access point which has accommodated the mobile station;

wherein the control unit receives a handover recommendation message from the server via the first wireless network interface, with response to the handover recommendation message, sending a handover request message via the first wireless network interface to the first access point, and, after sending the handover request message, communicates to the second access point which accommodates the mobile station via the second wireless network interface.

11. A mobile station according to claim 10, wherein the handover recommendation message is created by the server on the basis of result of comparison between a first wireless network condition and a second wireless network condition.

* * * * *